(12) United States Patent
Fisher et al.

(10) Patent No.: US 8,417,785 B2
(45) Date of Patent: Apr. 9, 2013

(54) DEVICE, SYSTEM, AND METHOD OF ELECTRONIC COMMUNICATION TO FACILITATE COLLABORATION AND MEETING

(75) Inventors: Amit Fisher, Nesher (IL); Aya Soffer, Haifa (IL); Gabi Zodik, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 12/033,021

(22) Filed: Feb. 19, 2008

(65) Prior Publication Data

US 2009/0210494 A1 Aug. 20, 2009

(51) Int. Cl.
*G06F 15/16* (2006.01)
*G06Q 10/00* (2006.01)
*G06Q 30/00* (2006.01)

(52) U.S. Cl.
USPC ............ 709/206; 709/224; 705/1.1; 705/26.1

(58) Field of Classification Search ........... 709/204–207
See application file for complete search history.

(56) References Cited

U.S. PATENT DOCUMENTS

| 7,284,033 | B2 | 10/2007 | Jhanji |
| 2005/0171799 | A1* | 8/2005 | Hull et al. .......................... 705/1 |
| 2006/0161599 | A1 | 7/2006 | Rosen |
| 2007/0226035 | A1 | 9/2007 | Doss et al. |
| 2009/0070665 | A1* | 3/2009 | Chijiiwa et al. .............. 715/235 |
| 2009/0106415 | A1* | 4/2009 | Brezina et al. ................. 709/224 |

OTHER PUBLICATIONS

Microsoft, Microsoft Office Outlook Product Guide, 2003, Google, p. 1-73.*

* cited by examiner

*Primary Examiner* — Ashok Patel
*Assistant Examiner* — Evans Desrosiers
(74) *Attorney, Agent, or Firm* — Dan Swirsky

(57) ABSTRACT

Device, system, and method of electronic communication to facilitate collaboration and meeting. For example, a method of inducing social interaction among users of an electronic communication network includes: receiving a first behavioral profile representing one or more schedule items of a first user; receiving a second behavioral profile representing one or more schedule items of a second user; identifying a time-slot in which the first and second users are available according to the first and second behavioral profiles, respectively, and identifying a common activity-of-interest reflected in the first and second behavioral profiles; and sending to the first and second users invitations to engage in said activity-of-interest in said time-slot.

15 Claims, 2 Drawing Sheets

DEVICE, SYSTEM, AND METHOD OF ELECTRONIC COMMUNICATION TO FACILITATE COLLABORATION AND MEETING

FIELD

Some embodiments are related to the field of electronic communication systems.

BACKGROUND

Some computing systems include planning applications allowing users to plan their subsequent appointments, tasks and activities. For example, a user of a desktop computer, a laptop computer, a Personal Digital Assistance (PDA) device, or a cellular phone may utilize a calendar application or a scheduling application in order to note a future appointment with a physician, a future business meeting with a colleague, a future time-slot in which the user plans to go jogging, or other activities.

In some computing systems, a first user is not able to view data entered by a second user onto the second user's scheduling application. For example, the second user may not be interested in allowing other users to view his scheduling data, e.g., due to privacy concerns. Additionally or alternatively, the first user may not be interested in manually reviewing the second user's scheduling data, since this may be time consuming or effort consuming for the first user.

SUMMARY

Some embodiments include, for example, devices, systems, and methods of electronic communication to facilitate collaboration and meeting.

In some embodiments, for example, a method of inducing social interaction among users of an electronic communication network includes: receiving a first behavioral profile representing one or more schedule items of a first user; receiving a second behavioral profile representing one or more schedule items of a second user; identifying a time-slot in which the first and second users are available according to the first and second behavioral profiles, respectively, and identifying a common activity-of-interest reflected in the first and second behavioral profiles; and sending to the first and second users invitations to engage in the activity-of-interest in the time-slot.

In some embodiments, the analyzing includes: receiving a contact list associated with the first user; and identifying the time-slot if the contact list associated with the first user includes a contact detail corresponding to the second user.

In some embodiments, the contact list includes one or more contact details from one or more sources selected from the group consisting of: a scheduling application; an electronic mail application; an instant messaging application; a Voice over Internet Protocol (VoIP) application; a web-based electronic mail service; and a virtual social network.

In some embodiments, the identifying includes: identifying the common activity-of-interest based on a textual comparison of the first and second behavioral profiles.

In some embodiments, the comparison takes into account a user-entered scheduling preference related to the activity-of-interest.

In some embodiments, the user-entered scheduling preference is selected from the group consisting of: a preferred time; a preferred date; a preferred day of the week; a preferred time length; a preferred maximum number of participants; a preferred minimum number of participants; a preferred exact number of participants; and a required number of participants.

In some embodiments, the first behavioral profile includes a summary of past schedule items, present schedule items, and future schedule items of the first user; and the second behavioral profile includes a summary of past schedule items, present schedule items, and future schedule items of the second user.

In some embodiments, the first and second behavioral profiles have the same storage structure.

In some embodiments, the storage structure includes: a first field indicating a title of an activity; a second field indicating a textual description of the activity; and a third field indicating at least time-related data of the activity.

In some embodiments, the method includes: receiving a first message indicating acceptance of the invitation by the first user; receiving a second message indicating acceptance of the invitation by the second user; and sending to the first and second users notifications to notify the first and second users, respectively, regarding an added schedule item corresponding to the time-slot and the activity-of-interest.

In some embodiments, the identifying includes: comparing the first and second behavioral profiles in response to a user command from the first user.

In some embodiments, a system for inducing social interaction among users of an electronic communication network includes: a server to receive a first behavioral profile representing one or more schedule items of a first user, and to receive a second behavioral profile representing one or more schedule items of a second user, wherein the server includes: a matching module to identify a time-slot in which the first and second users are available according to the first and second behavioral profiles, respectively, and to identify a common activity-of-interest reflected in the first and second behavioral profiles; and an invitation module to send to the first and second users invitations to engage in the activity-of-interest in the time-slot.

In some embodiments, a computing device includes: a scheduling application to manage one or more schedule items of a user of the computing device; and a scheduling agent to generate a behavioral profile representing one or more of the schedule items, to transfer the behavioral profile to a server, and to receive from the server an invitation to engage with another user in an activity-of-interest in a time-slot; wherein the time-slot includes a time-slot in which the user and another user are available according to the behavioral profile of the user and a behavioral profile of the other user; and wherein the activity-of-interest includes a common activity-of-interest reflected in the behavioral profile of the user and the behavioral profile of the other user.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
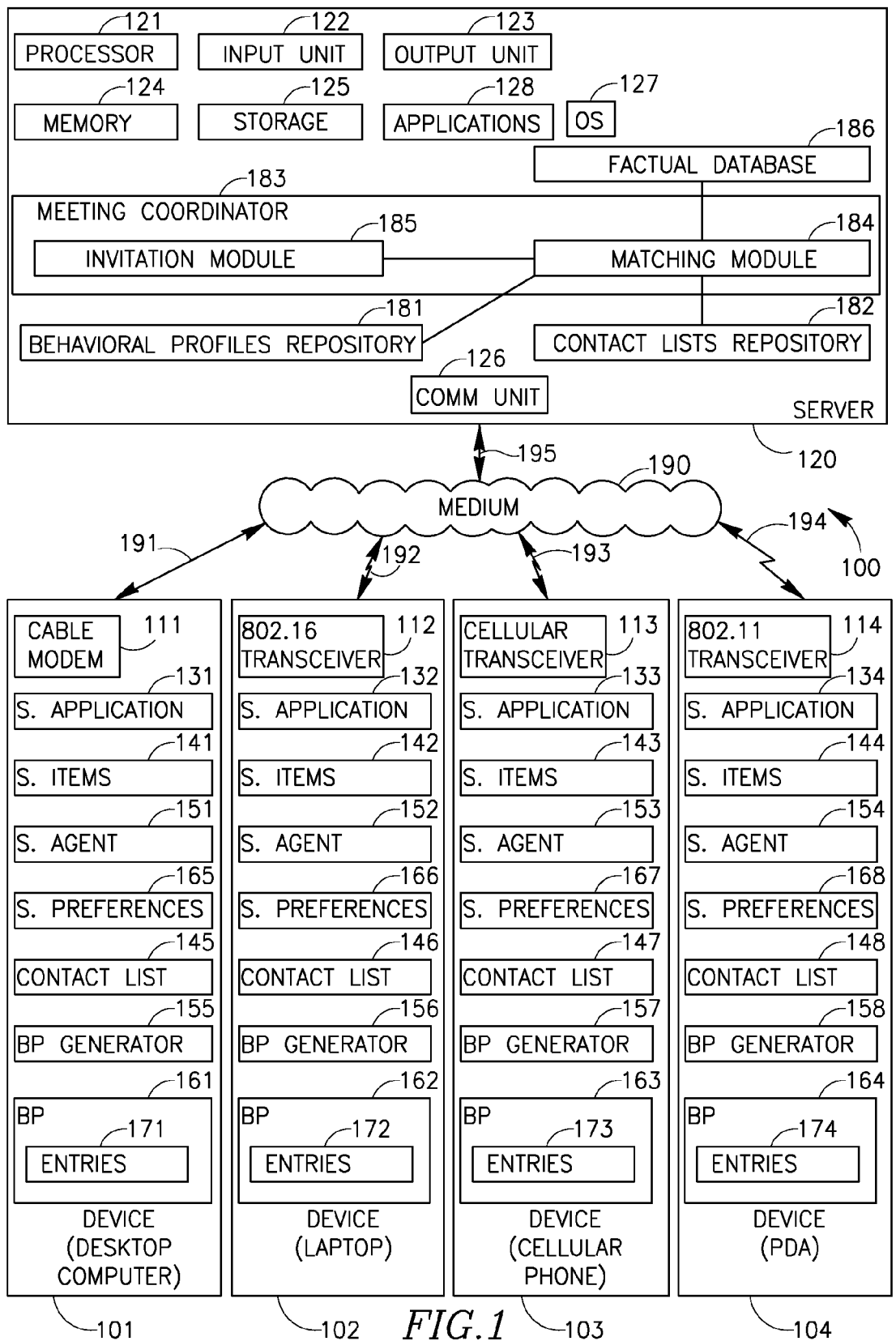
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth (RTM), Global Positioning System (GPS), IEEE 802.11 ("Wi-Fi"), IEEE 802.16 ("Wi-Max"), ZigBee™, Ultra-Wideband (UWB), Global System for Mobile communication (GSM), 2G, 2.5G, 3G, Third Generation Partnership Project (3GPP), 3.5G, or the like. Some embodiments may be used in conjunction with various other devices, systems and/or networks.

The term "wireless device" as used herein includes, for example, a device capable of wireless communication, a communication device capable of wireless communication, a communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like.

The terms "social network" or "virtual social network" or "VSN" as used herein include, for example, a virtual community, an online community, a community or assembly of online representations corresponding to users of computing devices, a community or assembly of virtual representations corresponding to users of computing devices, a community or assembly of virtual entities (e.g., avatars, usernames, nicknames, or the like) corresponding to users of computing devices, or the like.

In some embodiments, a virtual social network includes at least two users; in other embodiments, a virtual social network includes at least three users. In some embodiments, a virtual social network includes at least one "one-to-many" communication channels or links. In some embodiments, a virtual social network includes at least one communication channel or link that is not a point-to-point communication channel or link. In some embodiments, a virtual social network includes at least one communication channel or link that is not a "one-to-one" communication channel or link.

The terms "social network services" or "virtual social network services" as used herein include, for example, one or more services which may be provided to members or users of a social network, e.g., through the Internet, through wired or wireless communication, through electronic devices, through wireless devices, through a web-site, through a stand-alone application, through a web browser application, or the like. In some embodiments, social network services may include, for example, online chat activities; textual chat; voice chat; video chat; Instant Messaging (IM); non-instant messaging (e.g., in which messages are accumulated into an "inbox" of a recipient user); sharing of photographs and videos; file sharing; writing into a "blog" or forum system; reading from a "blog" or forum system; discussion groups; electronic mail (email); folksonomy activities (e.g., tagging, collaborative tagging, social classification, social tagging, social indexing); forums; message boards; or the like.

The terms "web" or "Web" as used herein includes, for example, the World Wide Web; a global communication system of interlinked and/or hypertext documents, files, websites and/or web-pages accessible through the Internet or through a global communication network; including text, images, videos, multimedia components, hyperlinks, or other content.

The term "user" as used herein includes, for example, a person or entity that owns a computing device or a wireless device; a person or entity that operates or utilizes a computing device or a wireless device; or a person or entity that is otherwise associated with a computing device or a wireless device.

The term "friend" as used herein includes, for example, another user; a family member; a relative; an acquaintance; a colleague; a co-worker; a person that the user knows from personal, professional or other backgrounds; a person that the user knows from real-world interaction or meeting; and/or a person that the user knows from virtual interaction and/or virtual meeting (e.g., email exchange, instant messaging, online chat, or the like).

The terms "scheduling application" or "SA" as used herein include, for example, an application that allows a user to store, edit, organize and/or retrieve information about past, present and/or future meetings, appointments, events and/or tasks; an application that allows a user to plan or schedule meetings, appointments, events and/or tasks; an application that allows a user to invite one or more other users to meetings, appointments, events and/or tasks; an application that presents the user with a calendar showing past, present and/or future meetings, appointments, events and/or tasks; an application that allows a user to store, edit, organize and/or otherwise utilize a task list, a "to do" list, a list of "action items", a list of required actions, or the like; an application that associated between time slots and meetings, appointments, events and/or tasks; an application that reminds a user (e.g., using visual and/or audible notification) of upcoming meetings, appointments, events and/or tasks; a Personal Information Manager (PIM) or other personal organizer application; a software-based scheduler; a hardware-based scheduler (e.g., embedded within a mobile phone or a handheld device); a scheduler implemented using software and/or hardware components; or the like.

The terms "schedule item" or "SI" as used herein include, for example, a meeting; an appointment; an activity; an event; a business activity or event; a personal activity or event; a real-world activity or event (e.g., attending a wedding); a virtual-world activity or event (e.g., a planned session of online chat, or a planned web-cast); a "to do" item; an "action item"; an information item for which a user requests to get a reminder from a scheduling application; a time slot in a scheduling application designated by a user for a particular purpose; a past schedule item; a present (e.g., currently ongoing) schedule item; a future schedule item; or the like.

At an overview, some embodiments include devices, systems, and methods of electronic communication to facilitate collaboration and meeting among multiple users and to induce or initiate social interaction among multiple users. Some embodiments allow to automate and/or generate meetings and collaboration opportunities among two or more users (e.g., a user and one or more friends of the user) having a common interest, a common hobby, or an interest in a common activity. Some embodiments allow to improve or optimize the utilization or free time of users, or allow to improve or optimize the utilization of users' schedules. Some embodiments may require that a user agree to share (e.g., fully or partially), with a central server and optionally with other users (e.g., directly or indirectly), his past or historic scheduling information, his present scheduling information, his future or planned scheduling information, his professional and/or personal scheduling information, and optionally his scheduling preferences or interests.

In some embodiments, an electronic system actively searches for new meeting opportunities among multiple users, during designated time slots in their scheduling applications. An analysis module (e.g., implemented as a behavioral profile generator) may analyze schedule items of a user (e.g., as reflected in his scheduling application), and may build a user behavioral profile, optionally enhanced with additional details about activities that the user wishes to perform but did not necessarily perform in the past. The system may analyze or compare the behavioral profiles of multiple users, for example, continuously, periodically, and/or upon demand. The system may search for matches corresponding to meeting opportunities among multiple users, e.g., among a user and his one or more friends. Once a meeting opportunity is identified, each one of the relevant parties is notified and a new meeting is proposed to the parties; if some or all of the parties (e.g., two or more, or the minimum number of required parties) accept, then the proposed meeting is finalized and is registered in the scheduling applications of the relevant parties.

FIG. 1 schematically illustrates a block diagram of a system 100 in accordance with some demonstrative embodiments of the invention. System 100 includes multiple client devices, for example, devices 101-104. Devices 101-104 may include wired computing devices and/or wireless computing devices. For example, device 101 may be a desktop computer having a cable modem 111; device 102 may be a laptop computer having an IEEE 802.16 transceiver 112; device 103 may be a cellular phone having a cellular transceiver 113; and device 104 may be a PDA device having an IEEE 802.11 transceiver 114. Other suitable client devices may be used, and other suitable communication methods may be used.

Each one of devices 101-104 is able to interact with a server 120 through one or more communication channels or mediums, for example, a shared access medium 190, e.g., utilizing communication links 191-195. The shared access medium 190 may be, for example, a global communication network, the Internet, the World Wide Web, a wired network, a wireless network, a combination of one or more wired networks and/or one or more wireless networks, or the like.

Device 101 may include a scheduling application 131 capable of storing one or more schedule items 141, and optionally capable of storing a contact list 145 (e.g., with contact details of friends of the user of device 101). Similarly, device 102 may include a scheduling application 132 capable of storing one or more schedule items 142, and optionally capable of storing a contact list 146 (e.g., with contact details of friends of the user of device 102). Device 103 may include a scheduling application 133 capable of storing one or more schedule items 143, and optionally capable of storing a contact list 147 (e.g., with contact details of friends of the user of device 103). Device 104 may include a scheduling application 134 capable of storing one or more schedule items 144, and optionally capable of storing a contact list 148 (e.g., with contact details of friends of the user of device 104).

Device 101 may further include a scheduling agent 151, capable of communicating with server 120 and/or with one or more of devices 102-104 for the purpose of generating new schedule items. Similarly, device 102 may include a scheduling agent 152; device 103 may include a scheduling agent 153; and device 104 may include a scheduling agent 154.

The scheduling agent 151 may be, for example, a stand-alone software application; a stand-alone software module or component; an extension or plug-in to the scheduling application 131; an integrated or built-in function of the scheduling application 131; a component or module of the scheduling application 131; or the like. The scheduling agent 151 may be able to access the schedule items 141 stored in (or stored by) the scheduling application 131. Furthermore, the scheduling agent 151 may be able to access the contact list 145, and may optionally be able to access other contact lists (or other contact details, not necessarily organized as a list) stored in device 101, for example, a contact list used by an email application, a contact list used by an Instant Messaging (IM) application, a contact list used by a Voice over IP (VoIP) application (e.g., "Skype"), or the like. In some embodiments, the contact list 145 may be stored locally in device 101; in other embodiments, the contact list 145 may be stored remotely, for example, a contact list stored by a Web-based email service (Web-mail), a contact list stored by a virtual social network (e.g., FaceBook or LinkedIn), or the like.

In some embodiments, contact list 145 may be or may include a contact list used by the scheduling application 131. In other embodiments, scheduling agent 151 may build or augment the contact list 145, for example, based on aggregation of contact details stored locally in client device 101 and/or store remotely and associated with the user of client device 101. For example, contact list 145 may include an aggregation (e.g., by the scheduling agent 151) of the contact list of the scheduling application 131, as well as contact details used by an email application, contact details used by an Instant Messaging (IM) application, contact details used by a Voice over IP (VoIP) application (e.g., "Skype"), contact details stored by a Web-based email service (Web-mail), contact details stored by a virtual social network (e.g., FaceBook or LinkedIn), or the like.

The scheduling agent 151 includes a behavioral profile generator 155, able to generate a behavioral profile 161 associated with the user of device 101. The generation of behavioral profile 161 is based on analysis of past, present and/or future schedule items 141, and optionally takes into account user-entered scheduling preferences 165. The behavioral profile 161 may be automatically generated periodically (e.g., once a day); and/or may be generated in response to a user command to generate the behavioral profile 161. The behavioral profile 161 may be automatically updated periodically (e.g., every hour, upon creation of a new schedule item 141, upon deletion of one or more schedule items 141, upon modification of one or more schedule items 141, and/or in response to a user command to update the behavioral profile 161.

The behavioral profile 161 may be, for example, a concise summary of information reflected in the schedule items 141, represented in accordance with a pre-defined format or data structure. In some embodiments, for example, the size (e.g., in bytes) of the behavioral profile 161 may be smaller, or significantly smaller, than the total size (e.g., in bytes) occupied by the schedule items 141 from which the behavioral profile 161 is derived and generated.

The behavioral profile 161 may include, for example, one or more records or entries 171, and each entry 171 may correspond to an activity (or to a type of activity) of the user of the device 110, for example, a past activity, a present activity, a future activity, or a recurring activity. For example, each entry 171 may represent (e.g., optionally using multiple fields) an activity name; an activity description; data generated by the behavioral profile generator 155 based on an analysis of the information of the schedule items 141; and optionally data generated by the behavioral profile generator 155 based on the user-entered scheduling preferences 165. In some embodiments, the behavioral profile 161 may utilize open taxonomy, and each entry 171 may have one or more values reflecting the information gathered from schedule items 141 with regard to a particular activity or type of activity (e.g., "behavior mining").

In a demonstrative example, each entry 171 may include a "name" field, a "description" field, a "history" field, and a "preferences" field. The "name" field in entry 171 may include a string of characters indicating a name of an activity associated with the user of device 101, e.g., "Tennis", "Swimming", "Fishing", "John's Birthday". The "description" field in entry 171 may include a free-text field describing the activity in more detail, optionally using flexible terms and not necessarily utilizing rigid taxonomy (e.g., "Swimming in the University Pool", "Fishing at the North Lake").

The "history" field in entry 171 may include, for example: a set of parameters indicating one or more time-slots associated with the activity (e.g., date and time in which the activity starts, together with the date and time in which the activity ends or together with the time length of the activity); as well as one or more locations associated with the activity. The "history" field may optionally include data about other participants associated with this activity, for example: names or other identifiers of friends of the user of device 101 who participated in the past in this activity; maximum number of participants, as derived from past activities; or minimum number of participants, as derived from past activities; exact number of required participants (e.g., exactly two participants are required for a "chess" activity); or the like. For example, the "history" field of entry 171 may be derived from one or more schedule items 141 that refer to past activities, present activities, future activities, and/or recurring activities. For example, based on an analysis of past activities reflected in the schedule items 141, the behavioral profile generator 155 may generate a "history" field having data indicating that with regard to the activity named "Tennis", ten sessions of this activity took place in the past, all of them took place on Tuesdays, all of them started at 16:00, all of them occupied between 60 to 90 minutes, eight out of the ten sessions were associated with the location "Beverly Hills Country Club", seven out of the ten sessions were associated with the participant "Arthur Adam", and three out of the ten sessions were associated with the participant "Bill Bundy".

The optional "preferences" field in entry 171 may include, for example: a set of parameters indicating one or more preferred time-slots associated with the activity (e.g., preferred date and time in which the activity should start in accordance with the user-entered scheduling preferences 165, together with the preferred date and time in which the activity should end in accordance with the user-entered scheduling preferences 165, or together with the preferred time length of the activity in accordance with the user-entered scheduling preferences 165); as well as one or more preferred locations associated with the activity in accordance with the user-entered scheduling preferences 165.

The "preferences" field may optionally include data about other preferences of the user of device 101 with regard to one or more other participants associated with this activity, for example: names or other identifiers of friends that the user of device 101 would like them to participate in this activity in accordance with the user-entered scheduling preferences 165; a preferred maximum number of participants in accordance with the user-entered scheduling preferences 165; a preferred minimum number of participants in accordance with the user-entered scheduling preferences 165; a preferred exact number of required participants (e.g., exactly two participants are required for a "chess" activity); or the like. In some embodiments, the "preferences" field may include "soft" preferences, e.g., reflecting non-mandatory or waiveable preferences of the user of device 101; and/or "hard" preferences, e.g., reflecting mandatory preferences or requirements posed by the user of device 101.

For example, based on the user-entered scheduling preferences 165, the "preferences" field associated with the activity named "Basketball" may include data indicating: that the user of device 101 prefers to engage in this activity on Saturdays or Sundays; that the user of device 101 prefers to engage in this activity after 14:00 and before 20:00; that the user of device 101 prefers to engage in this activity for a time length of 60 to 120 minutes; that the user of device 101 prefers to engage in this activity in the location named "Lincoln Sports Club"; that the user of device 101 prefers a minimum of 2 participants in this activity; that the user of device 101 prefers a maximum of 12 participants in this activity; that the user of device 101 prefers exactly 10 participants in this activity; that the user of device 101 requires an even number of participants in this activity; that the user of device 101 prefers that the user "Adam Arthur" participate in this activity; that the user of device 101 prefers that the user "Bill Bundy" does not participate in this activity; or the like.

The scheduling agent 151 may transfer, upload, publish, or otherwise transfer the locally-generated behavioral profile 161 to server 120. Client devices 102-104 may similarly include scheduling agents 152-154 (e.g., similar to scheduling agent 151); may similarly include contact lists 146-148 (e.g., similar to contact lists 145); may similarly include behavioral profile generators 156-158 (e.g., similar to behavioral profile generator 155) able to generate behavioral profiles 162-164 (e.g., similar to behavioral profile 161) having one or more entries 172-174 (e.g., similar to entry 171), based on schedule items 142-144 and optionally taking into account user-entered scheduling preferences 166-168. Similarly, scheduling agents 152-154 may transfer, upload, publish, or otherwise transfer the locally-generated behavioral profiles 162-164 to server 120.

Each one of the scheduling agents 151-154 may transfer the corresponding behavioral profile 161-164 to server 120, for example, automatically upon generation of the corresponding behavioral profile 161-164; automatically upon updating or modification of the corresponding behavioral profile 161-164; periodically (e.g., every hour, every day); and/or in response to a user command to transfer the corresponding behavioral profile 161-164 to server 120. The behavioral profiles 161-164 received by server 120 are stored in a behavioral profiles repository 181.

Additionally, each one of the scheduling agents 151-154 may transfer to server 120 the corresponding contact list 145-148. The transfer may be performed, for example, together with a transfer of the corresponding behavioral profile 161-164; automatically upon updating or modification of the corresponding contact list 145-148; periodically (e.g., every hour, every day); and/or in response to a user command to transfer the corresponding contact list 145-148 to server 120. The contact lists 145-148 received by server 120 are stored in a contact lists repository 182.

The behavioral profiles repository 181 and the contact lists repository 182 may be implemented using a single repository or database, or using relational database(s). For example, each behavioral profile stored in the behavioral profiles repository 181 may be associated with a contact list stored in the contact lists repository 182, and vice versa; as well as with an identifier of the corresponding device 101-104 which transferred them to server 120.

Server 120 further includes a meeting coordinator 183, for example, including a matching module 184 and an invitation module 185. The matching module 184 analyzes or compares the behavioral profiles 161-164 (or a subset thereof) with relation to the contact lists 145-148 (or a subset thereof), in order to find a common available time-slot for an activity in which two more users are interested, according to their behavioral profiles 161-164. The analysis may include, for example, a textual analysis or a textual comparison of multiple behavioral profiles 161-164, in order to identify common text reflecting a common activity-of-interest (e.g., "Tennis"). Based on matches determined by the matching module 184, the meeting coordinator 183 generates a "meeting opportunity" item, and invitations are sent by the invitation module 185 to the relevant users that are potential participants. Users that receive the invitations may either accept or reject them; if a suitable number of users (e.g., equal to the number of required participants; or greater than or equal to the minimum number of required participants, and smaller than or equal to the maximum number of allowed participants) accept the invitation, then the corresponding activity is added as a new schedule item 141-144 in the relevant scheduling applications 131-134, at the suitable time and date. The invitation module 185 tracks the status of invitations, for example, sent out and pending, rejected by an invitee, accepted by an invitee, finalized as a meeting, or the like.

For example, the matching module 184 analyzes or compares four user profiles 161-164: user profile 161 of the user Arthur Adam, which indicates that Arthur Adam engaged in the activity "Tennis" three times in the last four months; user profile 162 of the user "Bill Bundy", which does not include any reference to the activity "Tennis"; user profile 163 of the user "Charles Candor", which indicates that Charles Candor engages in the activity "Tennis" every Thursday at 15:00; and user 164 profile of the user "Debby Dean", which indicates that Debby Dean did not engage in the activity "Tennis" in the past, but that Debby Dean entered scheduling preferences 168 indicating that she in interested in playing Tennis in the future, preferably on weekday afternoons.

Based on the analysis, the matching module 184 may determine that the user Bob Bundy is not a suitable candidate for a joint "Tennis" activity, since the activity "Tennis" is not included in his behavioral profile 162; whereas the users Arthur Adam, Charles Candor and Debby Dean are suitable candidates for a join "Tennis" activity, since the activity "Tennis" is included in their behavioral profile.

The matching module 184 may further determine that the activity "Tennis" requires exactly two participants, or an even number of participants, based on a "preference" field which appears in one or more of the behavioral profiles 161, 163 and 164. In some embodiments, the matching module 184 may optionally utilize a factual database 186 having pre-stored information indicating minimum, maximum, or required number of participants in various activities. For example, the factual database 186 may indicate that the activity "Chess" requires exactly two participants; that the activity "Bridge" requires exactly four participants; that the activity "Tennis" requires either two or four participants; that the activity "Basketball" requires at least two participants, and not more than sixteen participants, and preferably includes exactly ten participants; or the like.

Based on the analysis, the matching module 184 may determine that Arthur Adam, who engaged in the past in the "Tennis" activity, is a suitable candidate to meet for a "Tennis" activity with Charles Candor, who engages in the "Tennis" activity every week. The matching module 184 may further determine one or more time-slots in which both of these users are available. Similarly, based on the analysis, the matching module 184 may determine that Arthur Adam, who engaged in the past in the "Tennis" activity, is a suitable candidate to meet for a "Tennis" activity with Debby Dean, who indicated her interest to engage in this activity; and may further determine one or more time-slots in which both of these users are available. Similarly, based on the analysis, the matching module 184 may determine that Charles Candor, who engages in the "Tennis" activity every week, is a suitable candidate to meet for a "Tennis" activity with Debby Dean, who indicated her interest to engage in this activity; and may further determine one or more time-slots in which both of these users are available.

In some embodiments, the matching module 184 may be configured to disregard some available time-slots, or to regard particular time-slots as unavailable (even though they appear to be available in user's scheduling applications), for example, to avoid scheduling of the "Tennis" activity to a time slot that begins after 22:00 and before 06:00, or to avoid scheduling of activities during business hours (e.g., from 09:00 to 17:00 on weekdays).

The matching module 184 may thus generate three matches (namely, Arthur and Charles; Arthur and Debby; and Charles and Debby), and each match may be associated with one or more time-slots in which the corresponding participants are available. Optionally, the matching module 184 may prioritize the matches, or otherwise associate the matches with match quality indicators, based on pre-defined priority rules. For example, the matching module 184 may determine that Charles Candor (who engages in the "Tennis" activity every week) and Debby Dean (who indicated her interest in this activity) is a stronger match than Arthur Adam (who only engaged in the "Tennis" activity in the past, and may no longer be interested in this activity) and Debby Dean (who indicated her interest in this activity).

In some embodiments, the scheduling agent 151 may be used by the user of device 101 in order to actively initiate a search, by system 100, for potential participants that may join the user in a particular activity having a particular time-slot. For example, the user of device 101 utilizes his scheduling application 131 to create a new schedule item 141, indicating that he plans to go to the Modern Art Museum on the following day at noon. The user may then utilize the scheduling agent 151 to activate a particular search for potential participants among the user's friends, based on an analysis by the matching module 184 of their behavioral profile. For example, the user may configure the scheduling preferences 165 to indicate that he prefers to be joined by no more than three other participants. Optionally, the user may enter a command (e.g., by right-clicking the schedule item 141 and selecting a command) instructing the server 120 to search and suggest meeting opportunities for this planned activity.

The matching module 184 may automatically analyze or compare the behavioral profiles of the friends of the user; may filter-out friends whose behavioral profile does not mention "museum" or "art"; and may further filter-out friends that are unavailable on the following day at noon. From the remaining users, the matching module 184 may select one or more users based on an analysis of their behavioral profiles. For example, the matching module 184 may determine that the user Arthur Adam is a high-quality match for this activity, since his behavioral profile indicates that he engages in a "Museum" activity every Tuesday at noon. Additionally or alternatively, the matching module 184 may determine that the user Bill Bundy is a reasonable-quality match for this activity, since his behavioral profile indicates that he engages in a "Museum" activity once a week; or that the user Charles Candor is a reasonable-quality match for this activity, since his behavioral profile indicates that he is also looking for a co-participant to join him in a "Museum" activity. In some embodiments, invitations to join an ad-hoc meeting, which is about to take place within a relatively short time (e.g., within a time period smaller than four hours), may optionally be sent by email, by SMS, by IM, using phone messages (e.g., utilizing a text-to-voice component), using online notification tools, or the like.

In some embodiments, the user who initiated an active search for co-participants in a planned activity may be presented with a list of possible matches, prior to sending invitations to any potential participant. The initiating user may review the list of possible matches, may select from the list one or more meeting opportunities that he prefers, may remove from the list one or more meeting opportunities that he is not interested in, or may otherwise modify the suggested matches (e.g., by adding or removing particular friends; for example, if the user knows that if John is invited, then John's wife should be invited too). Optionally, the user may rank the meeting opportunity in accordance with an order of preference, such that the server 120 and the invitation module 185 attempt to establish a meeting having a higher ranking before attempting to establish a meeting having a lower ranking.

In some embodiments, the matching module 184 may generate meeting opportunities at time-slots that are "near", or "around", or in proximity to, time-slots preferred by one or more users or time-slots in which one or more users are unavailable. For example, the matching module 184 may determine that four users are interested in a "Bridge" activity; that a first user prefers that the activity take place between 18:00 and 19:00; that a second user and a third user can accommodate this time-slot; but that a fourth user is formally unavailable in this time-slot, since she has another activity scheduled to take place from 17:00 to 18:30. In some embodiments, the matching module 184 may generate a meeting opportunity for the time-slot of 18:30 to 19:30, which is "near" the original time-slot preferred by the first user, and is suitable for all four users. In other embodiments, the matching module 178 may generate a meeting opportunity for the time-slot of 18:30 to 19:00, which is part of the original time-slot preferred by the first user, and is also suitable for all four users. In yet other embodiments, the matching module 184 may generate a meeting opportunity for the time-slot of 18:00 to 19:00, which is suitable for three out of four users, and may suggest to the fourth user to change his schedule. In some embodiments, a meeting opportunity may be generated if a pre-defined percentage of the required participants are available at the relevant time-slot (e.g., if three out of four Bridge players are available), such that the other users (e.g., the fourth user) may receive the invitation and may consider changing their agenda in order to accommodate the invitation. In some embodiments, the user may configure his scheduling preferences 165 to reflect whether or not the user is interested in reviewing meeting opportunities that are "near" or "around" preferred time-slots; whether or not the user is interested in reviewing meeting opportunities that coincide or overlap (entirely, or partially) with his already-occupied time-slots; and a time difference defining the "near" time-slot (e.g., defining "near" to be not more than one hour before a preferred time-slot and not more than 30 minutes after a preferred time-slot).

In some embodiments, the matching module 184 searches for meeting opportunities for a particular user by scanning the behavioral profiles of users that are members in the contact list of that user, and by applying a textual analysis to identify two or more matching behavioral profiles. Optionally, the search may utilize "fuzzy" logic, may not utilize fixed ontology or fixed taxonomy, may be based on the content of the "name" field and/or the "description" field in entries of the behavioral profiles, and/or may take into account the location for the planned activity. The matching process may then scan the planned schedule of the relevant parties by analyzing their behavioral profiles to identify available time-slots which coincide, or are "near" (e.g., a pre-defined time before or after), the preferred time and date specified by one or more users (e.g., via the scheduling preferences). If the minimum number of matching behavioral profiles is found, and the behavioral profiles indicate not only a match but also a common available time-slot, then a proposed meeting invitation is sent to the client devices of the relevant parties, for their acceptance or rejection. In some embodiments, if no free time-slot is found in the searched user profiles (namely, the user profiles of friends of the initiating user), then the matching module 184 may search for the closest time-slot which other users can accommodate; the matching module 184 may send a proposed meeting notice to the initiating user, and if he accepts the alternative time-slot then a meeting invitation is sent to the other relevant parties, for their acceptance or rejection.

In some embodiments, system 100 may optionally recommend to a user to modify or augment his contact list 145, for example, based on matching interests identified by the matching module 184, or based on the user's participation in a virtual social network (e.g., FaceBook, LinkedIn, or the like). In some embodiments, for example, a user may define how close a person may be relative to the user in a common social network in order to be regarded as a member of a contact list 145 of the user. For example, in some embodiments, a user may define that his contact list 145 includes his email address book, his IM "buddy" list, persons that are defined as his "friends" on the FaceBook social network, and persons that are defined as "friends" of his "friends" on the FaceBook social network.

In some embodiments, the behavioral profile 161 is generated locally in the client device 101 by the scheduling agent 151. In other embodiments, the behavioral profile 161 may be generated remotely from the client device 101, e.g., by server 120; for example, the scheduling agent 151 may transfer to (or share with) server 120 the schedule items 141, and a behavioral profile generator of server 120 may generate the behavioral profile 161 based on the information imported from the client device 101.

In some embodiments, the scheduling agent 151 may utilize one or more available communication channels in order to communicate with server 120, for example, wired communication, wireless communication, IEEE 802.11 communication, IEEE 802.16 communication, cellular communication, location-based services, or the like.

In some embodiments, system 100 may be utilized by a user of device 101 in order to fill-in a free time-slot in his scheduling application 131, and optionally in order to engage in a particular activity-of-interest with one or more of his friends. For example, the user of device 101 has a free time-slot on Fridays afternoon, and he configures the scheduling agent 151 in order to invoke a search for potential partners to engage in a "Bridge" activity. If three additional friends are found to be available (and optionally, for example, if also each one of their behavioral profiles relates to "Bridge"), then a meeting opportunity is generated by the matching module 184 and the invitation module 185 sends out invitations to the four participants (e.g., directly, or after a pre-approval of the user of device 101). In this case, since the "Bridge" activity requires exactly four participants, only if all the four potential participants accept the meeting, then the meeting is finalized and entered into the scheduling applications of the four participants.

In some embodiments, system 100 may be utilized by the user of device 101 in other to enhance, improve, or augment (e.g., by adding participants to) an already-planned meeting or activity that the user plans to engage in. For example, scheduling application 131 of device 101 reflects that the user of device 101 engages in the "Tennis" activity regularly on Saturday mornings at the "Beverly Hills Country Club"; this data is thus further reflected in the behavioral profile 161 associated with the user of device 101. The user may configure his scheduling agent 151 in order to search for additional partners that may be interested in occasionally joining the user for the "Tennis" activity; for example, the user plans to play tennis with his current tennis partner anyway, but the user is also interested in inviting additional friends (e.g., up to two more friends) to join them occasionally if they accept.

In some embodiments, server 120 may be implemented using suitable hardware components and/or software components, for example, a processor 121, an input unit 122, an output unit 123, a memory unit 124, a storage unit 125, and a communication unit 126. Similar components may be included in the client devices 101-104.

Processor 121 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 121 executes instructions, for example, of an Operating System (OS) 127 or of one or more applications 128.

Input unit 122 includes, for example, a keyboard, a keypad, a mouse, a touch-pad, a joystick, a track-ball, a stylus, a microphone, or other suitable pointing unit or input device. Output unit 123 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 124 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 125 includes, for example, a hard disk drive, a floppy disk drive, a Compact Disk (CD) drive, a CD-ROM drive, a Digital Versatile Disk (DVD) drive, an internal or external database or repository, or other suitable removable or non-removable storage units. Memory unit 124 and/or storage unit 125, for example, store data processed by server 120.

Communication unit 126 includes, for example, a wired or wireless transceiver, a wired or wireless modem, a wired or wireless Network Interface Card (NIC), or other unit suitable for transmitting and/or receiving communication signals, blocks, frames, transmission streams, packets, messages and/or data. Optionally, communication unit 126 includes, or is associated with, one or more antennas.

In some embodiments, some or all of the components of server 120 are enclosed in a common housing or packaging, and are interconnected or operably associated using one or more wired or wireless links. In other embodiments, components of server 120 are distributed among multiple or separate devices or locations.

Some embodiments may utilize client/server architecture, publisher/subscriber architecture, centralized architecture, scalable Peer-to-Peer (P2P) architecture, a fully distributed architecture, a semi-distributed or partially-distributed architecture, or other suitable architectures or combinations thereof.

Figure 2:
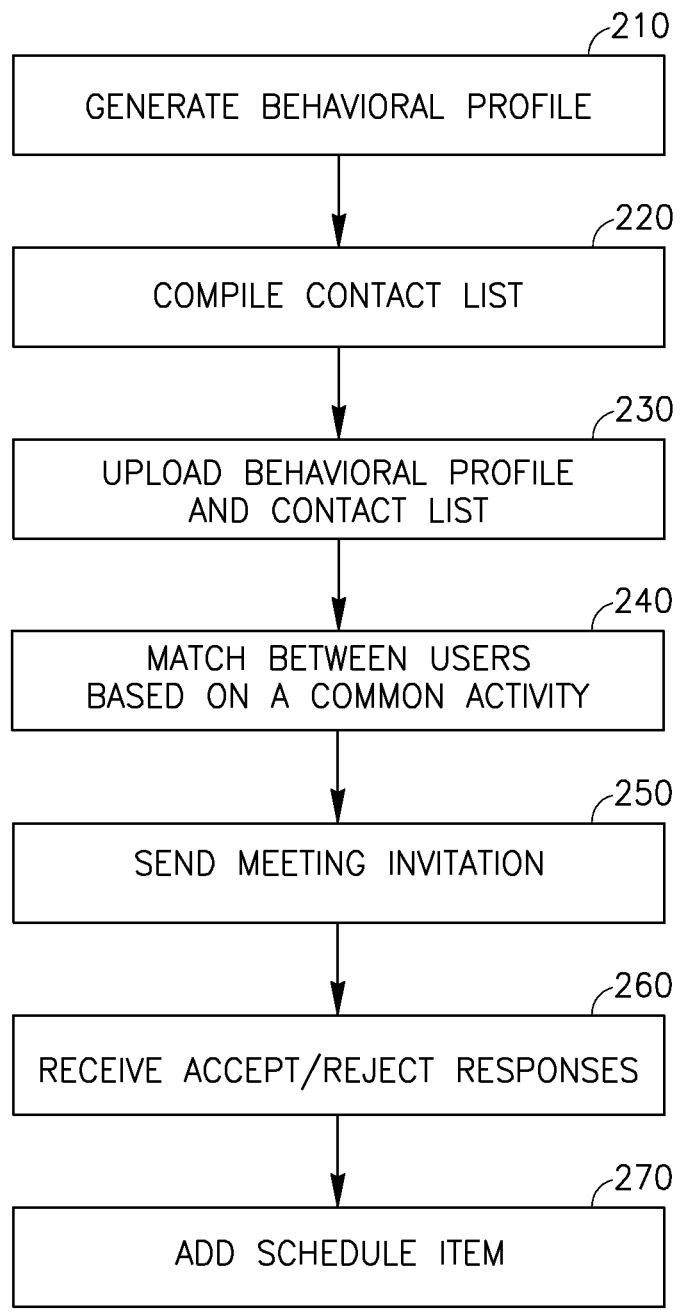
FIG. 2 is a schematic flow-chart of a method of electronic communication to facilitate collaboration and meeting, in accordance with some demonstrative embodiments of the invention.

FIG. 2 is schematic flow-chart of a method of electronic communication to facilitate collaboration and meeting, in accordance with some demonstrative embodiments of the invention. Operations of the method may be used, for example, by system 100 of FIG. 1, and/or by other suitable units, devices and/or systems.

In some embodiments, the method may include, for example, generating a behavioral profile of a user (block 210). This may be performed, for example, by a scheduling agent based on analysis of schedule items stored by a scheduling application, e.g., past activities, present activities, and/or future activities. In some embodiments, this operation may optionally take into account user-entered scheduling preferences regarding an activity that the user is interested in, for example, preferred time-slot, preferred participant(s), minimum number of participants, maximum number of participants, exact number of required participants, preferred number of participants, or the like.

In some embodiments, the method may optionally include, for example, compiling an augmented contact list of friends of the user (block 220). This may include, for example, aggregation (e.g., by the scheduling agent) of the contact list of the scheduling application, as well as contact details used by an email application, contact details used by an Instant Messaging (IM) application, contact details used by a Voice over IP (VoIP) application (e.g., "Skype"), contact details stored by a Web-based email service (Web-mail), contact details stored by a virtual social network (e.g., FaceBook or LinkedIn), or the like.

In some embodiments, the method may include, for example, uploading to a server the behavioral profile and the contact list (block 230).

In some embodiments, the method may include, for example, matching between a first user and a second user (block 240), based on a common activity reflected in their respective behavioral profiles; wherein the first user is included in the contact list of the second user, and/or the second user is included in the contact list of the first user; and wherein the behavioral profiles of the first and second users indicates a common available time-slot.

In some embodiments, the method may include, for example, sending a meeting invitation to the first and second users (block 250).

In some embodiments, the method may include, for example, receiving acceptation/rejection responses from the first and second users (block 260).

In some embodiments, the method may include, for example, adding a schedule item into the scheduling applications of the second users (block 270), reflecting a common activity or meeting planned to take place in the common available time-slot. This may be performed, for example, only if both the first and second users accepted the invitation.

Other suitable operations or sets of operations may be used in accordance with some embodiments.

Although portions of the discussion herein relate, for demonstrative purposes, to collaboration and/or meetings between two users, some embodiments may be utilized to facilitate or induce collaboration and/or meetings among other numbers of users, for example, three users, four users, five users, or the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. A method of inducing social interaction among users of an electronic communication network, the method comprising:
   analyzing behavior data associated with a first user of an electronic communication network to identify activities of interest to said first user, locations frequented by said first user, and patterns of activity of said first user, thereby producing a first behavioral profile of said first user;
   analyzing behavior data associated with a second user of said electronic communication network to identify interests of said second user, locations frequented by said second user, and patterns of activity of said second user, thereby producing a second behavioral profile of said second user;
   identifying a target time-slot common to schedules of said first and second users during which the first and second users are available;
   identifying as a target activity-of-interest one of said activities known to be of interest to both said first user and said second user;
   identifying a target location proximate to any of said locations in each of said behavioral profiles; and
   sending to the first and second users invitations to engage in said target activity-of-interest in said target time-slot at said target location, wherein said analyzing, identifying, and sending steps are performed by an entity other than said first and second users.

2. The method of claim 1, wherein said step of identifying said time slot comprises identifying where said behavioural profiles include user-entered scheduling preferences related to the activity-of-interest.

3. The method of claim 1, and further comprising:
   receiving a first message indicating acceptance of the invitation by the first user;
   receiving a second message indicating acceptance of the invitation by the second user; and
   sending to the first and second users notifications that a schedule item corresponding to said time-slot and said activity-of-interest has been added within a scheduling application of said first user and within a scheduling application of said second user.

4. The method of claim 1, wherein any of said identifying steps comprises comparing the first and second behavioral profiles in response to a command from the first user.

5. The method according to claim 1 wherein said identifying steps are performed
   independent of an explicit request by said first user to engage in said activity-of-interest specifically with said second user, and
   independent of an explicit request by said second user to engage in said activity-of-interest specifically with said first user.

6. The method according to claim 1 and further comprising performing said identifying steps wherein said target activity-of-interest, said target time-slot, and said target location correspond respectively to a corresponding activity, a corresponding location, and a corresponding time-slot for which an association exists between said corresponding activity, said corresponding location, and said corresponding time-slot with respect to a pattern of activity in each of said behavioral profiles.

7. A system for inducing social interaction among users of an electronic communication network, the system comprising:
   a server configured to
      analyze behavior data associated with a first user of an electronic communication network to identify activities of interest to said first user, locations frequented by said first user, and patterns of activity of said first user, thereby producing a first behavioral profile of said first user, and to
      analyze behavior data associated with a second user of said electronic communication network to identify interests of said second user, locations frequented by said second user, and patterns of activity of said second user, thereby producing a second behavioral profile of said second user;
   a matching module configured to
      identify a target time-slot common to schedules of said first and second users during which the first and second users are available, and to
      identify as a target activity-of-interest one of said activities known to be of interest to both said first user and said second user;
      identify a target location proximate to any of said locations in each of said behavioral profiles; and
   an invitation module configured to send to the first and second users invitations to engage in said target activity-of-interest in said target time-slot at said target location, wherein said analyzing, identifying, and sending steps are performed by an entity other than said first and second users.

8. The system of claim 7, wherein the matching module is further configured to identify said time-slot by comparing user-entered scheduling preferences included in said behavioural profiles and related to the activity-of-interest.

9. The system of claim 7, wherein the invitation module is configured to
   receive a first message indicating acceptance of the invitation by the first user, to
   receive a second message indicating acceptance of the invitation by the second user, and to
   send to the first and second users notifications that a schedule item corresponding to said time-slot and said activity-of-interest has been added to a scheduling application of said first user and a scheduling application of said second user.

10. The system of claim 7, wherein the matching module is configured to compare the first and second behavioral profiles in response to a command from the first user.

11. The system according to claim 7 wherein said matching module is configured to perform said identifying steps
   independent of an explicit request by said first user to engage in said activity-of-interest specifically with said second user, and
   independent of an explicit request by said second user to engage in said activity-of-interest specifically with said first user.

12. The system according to claim 7 wherein said matching module is configured to perform said identifying wherein said target activity-of-interest, said target time-slot, and said target location correspond respectively to a corresponding activity, a corresponding location, and a corresponding time-slot for which an association exists between said corresponding activity, said corresponding location, and said corresponding time-slot with respect to a pattern of activity in each of said behavioral profiles.

13. A computer program product for inducing social interaction among users of an electronic communication network, the computer program product comprising:
   a non-transitory computer-readable medium; and
   computer-readable program code embodied in said physically-tangible computer-readable medium, wherein the computer-readable program code when executed on a computer causes the computer to
   analyze behavior data associated with a first user of an electronic communication network to identify activities of interest to said first user, locations frequented by said first user, and patterns of activity of said first user, thereby producing a first behavioral profile of said first user,
      analyze behavior data associated with a second user of said electronic communication network to identify interests of said second user, locations frequented by said second user, and patterns of activity of said second user, thereby producing a second behavioral profile of said second user,
      identify a target time-slot common to schedules of said first and second users during which the first and second users are available,
      identify as a target activity-of-interest one of said activities known to be of interest to both said first user and said second user,
      identify a target location proximate to any of said locations in each of said behavioral profiles; and
      send to the first and second users invitations to engage in said target activity-of-interest in said target time-slot at said target location, wherein said analyzing, identifying, and sending steps are performed by an entity other than said first and second users.

14. The computer program product according to claim 13 wherein said computer-readable code is operative
   independent of an explicit request by said first user to engage in said activity-of-interest specifically with said second user, and
   independent of an explicit request by said second user to engage in said activity-of-interest specifically with said first user.

15. The computer program product according to claim 13 wherein said computer-readable program code when executed on a computer causes the computer to perform said identifying wherein said target activity-of-interest, said target time-slot, and said target location correspond respectively to a corresponding activity, a corresponding location, and a corresponding time-slot for which an association exists between said corresponding activity, said corresponding location, and said corresponding time-slot with respect to a pattern of activity in each of said behavioral profiles.

* * * * *